United States Patent
Momose

(10) Patent No.: US 7,184,380 B2
(45) Date of Patent: Feb. 27, 2007

(54) REPRODUCING DEVICE, REPRODUCING METHOD AND AUDIO DATA STORAGE MEDIUM

(75) Inventor: Takeshi Momose, Tokyo (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 10/182,778

(22) PCT Filed: Nov. 2, 2001

(86) PCT No.: PCT/JP01/09647

§ 371 (c)(1),
(2), (4) Date: Aug. 1, 2002

(87) PCT Pub. No.: WO02/50834

PCT Pub. Date: Jun. 27, 2002

(65) Prior Publication Data

US 2003/0002417 A1    Jan. 2, 2003

(30) Foreign Application Priority Data

Dec. 20, 2000 (JP) ............................ 2000-387710

(51) Int. Cl.
*G11B 7/005* (2006.01)
(52) U.S. Cl. .................................. 369/59.13
(58) Field of Classification Search ............ 369/59.13, 369/59.25, 47.16, 275.3, 53.22, 53.37, 124.06, 369/47.24
See application file for complete search history.

(56) References Cited

U.S. PATENT DOCUMENTS

| | | | | |
|---|---|---|---|---|
| 5,778,257 | A * | 7/1998 | Tsukatani et al. | 710/74 |
| 5,926,448 | A * | 7/1999 | Yokota et al. | 369/47.33 |
| 6,018,506 | A * | 1/2000 | Okabe et al. | 369/30.23 |
| 6,249,641 | B1 * | 6/2001 | Yokota | 386/94 |
| 6,424,615 | B1 * | 7/2002 | Ishimura et al. | 369/275.3 |
| 2003/0081932 | A1 * | 5/2003 | Hanes | 386/46 |
| 2003/0128648 | A1 * | 7/2003 | Wagner et al. | 369/124.06 |
| 2003/0142604 | A1 * | 7/2003 | Nakamura | 369/53.22 |

FOREIGN PATENT DOCUMENTS

JP    9-139055    5/1997
WO    96/38842    12/1996

OTHER PUBLICATIONS

English translation of JP/09-139055.*

* cited by examiner

*Primary Examiner*—Andrea Wellington
*Assistant Examiner*—Lixi Chow
(74) *Attorney, Agent, or Firm*—Oblon, Spivak, McClelland, Maier & Neustadt, P.C.

(57) ABSTRACT

In order to provide an audio device capable of making more effective use of non-compressed audio data and compressed audio data, according to the present invention, compressed audio data as computer data is stored in a data track in a Mixed-mode CD. By allowing a playback apparatus to recognize the presence of the compressed audio data, both the compressed audio data and non-compressed audio data stored in a CD-DA track are played back.

5 Claims, 6 Drawing Sheets

REPRODUCING DEVICE, REPRODUCING METHOD AND AUDIO DATA STORAGE MEDIUM

TECHNICAL FIELD

The present invention relates to a playback apparatus for audio data, and more particularly, to an apparatus capable of playing back an audio data storage medium having a mixture of non-compressed audio data and compressed audio data.

BACKGROUND ART

Presently, the most popular standard or medium for storing audio data is CD-DA (CD-Digital Audio). In CD-DA, a 74-minute digital signal can be recorded on a disk having a diameter of 12 cm. Recently, however, audio data compression techniques such as MP3 (MPEG-1 Audio Layer-III), ATRAC3 (Adaptive Transform Acoustic Coding 3), and WMA (Windows Media Audio) have been developed, and more and more users have enjoyed music on their computers using audio data which has been compressed by such compression techniques. Such compression techniques have features to compress the capacity of CD-DA audio data to, for example, about 1/10, and to provide low degradation in sound quality. In terms of the recording time of music, CD-DA non-compressed audio data is limited to a capacity of about 74 minutes per disk, while compressed audio data can have a capacity of over 700 minutes per disk. The compressed audio data can be written to, for example, a Recordable CD (Recordable Compact Disc), and audio devices capable of playing back Recordable CDs having compressed audio data written thereto have been marketed.

As described above, when users enjoy music, she/he can use non-compressed audio data and compressed audio data. It is an object of the present invention to provide an audio device capable of making more effective use of non-compressed audio data and compressed audio data.

DISCLOSURE OF INVENTION

It is possible to write both CD-DA audio data files and data files in another format. In disks of this type, two formats, namely, Mixed-mode CD and Enhanced CD (also called CD-Extra) are currently available.

The Mixed-mode CD refers to a CD (Compact Disc) having a data track and an audio track stored on a single medium. More specifically, as shown in FIG. 6, a data track and a CD-DA track are written, in this order, in a single session. As used herein, data track refers to a track region having data in a computer-processible format (computer data) stored thereon, and CD-DA track refers to a track region having CD-DA non-compressed audio data stored thereon. The Mixed-mode CD is often used for software games, etc. In this case, a game program is written on the data track, and background music for the game is written on the CD-DA track. Basically, the Mixed-mode CD is a standard for personal computers. Thus, if the disk is played back on an audio CD player, no sound or loud noise sound is produced from the data track portion. If it is to be played back on a CD-ROM player for a personal computer, on the other hand, the CD-ROM player only recognizes the data track, but does not read the data on the CD-DA track.

The Enhanced CD includes first and second, that is, two, sessions; the first session has a CD-DA track written therein and the second session has a data track written therein. The second session is stored in a mode capable of recording moving pictures, images, and programs. In most cases, video clips, picture albums, mini-games, screen savers, etc., are recorded in the second session. If this disk is played back on a music CD player, the music CD player can only recognize the CD-DA track in the first session, thus causing only the CD-DA track on the inner circumference to be played back as a CD-DA disk. Therefore, the problem of producing noise does not occur. When it is to be played back on a CD-ROM player for a personal computer, on the other hand, the CD-ROM player recognizes and processes only the data track in the second session.

It would be more beneficial to users to write two kinds of data, namely, CD-DA non-compressed audio data and compressed audio data, on a single disk and to play back this disk on a single audio device. As described above, in the conventional art, disks capable of having both CD-DA audio data files and data files in other formats written thereon are available, and it is possible to write CD-DA audio data and compressed audio data to a single disk, such as a Recordable CD. By doing so, a novel music medium having music sensitive to sound quality written as CD-DA audio data and music otherwise written as compressed audio data can be achieved.

Audio devices capable of playing back compressed audio data have been available heretofore. When a disk is inserted therein, the audio device can recognize that the disk is either a CD-DA disk or a compressed audio data, for example, MP3, disk and can play back the disk. However, the audio device does not assume that a mixture of CD-DA audio data and compressed audio data is written on a single disk. That is, the audio device cannot play back a disk having a mixture of CD-DA audio data and compressed audio data written thereon to play back both the CD-DA audio data and the compressed audio data. Accordingly, the present invention provides a medium having a mixture of non-compressed audio data such as CD-DA and compressed audio data as computer data, and also provides a playback apparatus capable of playing back both the non-compressed audio data and the compressed audio data on such a medium.

Specifically, the present invention provides a playback apparatus for playing back a medium having audio data stored thereon, including: a determining unit for determining if a predetermined medium received therein contains a mixture of compressed audio data and non-compressed audio data; and a playback mechanism for playing back the compressed audio data and the non-compressed audio data, which are stored in the medium, based on the determination result of the determining unit.

In the playback apparatus according to the present invention, the compressed audio data can have a computer data format.

The playback apparatus according to the present invention can determine if it contains a mixture of compressed audio data and non-compressed audio data, and can play back the audio data according to that determination result, thereby allowing a medium having a mixture of compressed audio data and non-compressed audio data to be played back without changing the medium.

Whereas, an audio device in the conventional art does not presume that compressed audio data and non-compressed audio data are mixed in a single disk, and cannot determine the mixture.

In the playback apparatus according to the present invention, if the predetermined medium received in the playback apparatus includes a session formed of a lead-in, a data storage area, and a lead-out, the determining unit should determine if compressed audio data and non-compressed audio data are mixed in the data storage area in the session.

In a Mixed-mode CD in the state of the art, a data track and a CD-DA track are written, in this order, in a single session. Thus, by recognizing that the predetermined medium is a Mixed-mode CD, and that compressed audio data is present in the data track, it is possible to determine that compressed audio data and non-compressed audio data are mixed in the data storage medium in the session.

In the playback apparatus according to the present invention, if the predetermined medium received in the playback apparatus includes at least two sessions each formed of a lead-in, a data storage area, and a lead-out, the determining unit should determine if compressed audio data is stored in the data storage area in one session of the two sessions and if non-compressed audio data is stored in the data storage area in the other session. In an Enhanced CD in the state of the art, as described above, a CD-DA track is written in a first session, and a data track is written in a second session. Thus, by recognizing that the predetermined medium has two sessions, and that compressed audio data is present in the second session, it is possible to determine that it is a medium having a mixture of compressed audio data and non-compressed audio data.

Furthermore, the playback apparatus according to the present invention can play back a medium having only CD-DA data stored thereon or a medium having only compressed audio data stored thereon if the determining unit determines whether only either compressed audio data or non-compressed audio data is stored in the data storage area in the session.

As known in the art, session as used herein refers to a unit of a region having a group of three storage portions consisting of a lead-in, a data storage area, and a lead-out, in which the lead-in at least includes information on the storage position of data, and the lead-out includes information indicating the end portion of the session. The concept of the session, the lead-in, and the lead-out in the present invention takes after the concept known in the art.

The present invention further provides a playback apparatus for playing back a medium having audio data stored thereon, including: a playback mechanism including a compressed audio data playback mode and a non-compressed audio data playback mode; a determining unit for determining whether one or both of non-compressed audio data and compressed audio data are stored in a predetermined medium received therein; and a control unit for selecting a playback mode in the playback mechanism based on the determination result of the determining unit, wherein the control unit selects the non-compressed audio data playback mode if the determining unit determines that only non-compressed audio data is stored as audio data in the predetermined medium, selects the compressed audio data playback mode if the determining unit determines that only compressed audio data is stored as audio data in the predetermined medium, and selects both the compressed audio data playback mode and the non-compressed audio data playback mode if the determining unit determines that both non-compressed audio data and compressed audio data are stored in the predetermined medium.

This playback apparatus determines what audio data is stored in the medium, and selects the playback mode according to the determination result, thereby allowing a user to enjoy music without worrying about the format of the medium. In addition, a medium having both compressed audio data and non-compressed audio data stored thereon can be played back without changing the medium.

In the playback apparatus according to the present invention, if the predetermined medium received in the playback apparatus includes a session formed of a lead-in, a data storage area, and a lead-out, the determining unit may recognize that non-compressed audio data and data in another format are stored in the data storage area in the session, and may recognize that compressed audio data is contained in the data in another format, thereby determining that both non-compressed audio data and compressed audio data are stored in the predetermined medium.

In the playback apparatus according to the present invention, the determining unit may recognize whether or not a plurality of sessions are included in the predetermined medium, and may recognize that compressed audio data is contained in at least one session of the plurality of sessions, thereby determining that both non-compressed audio data and compressed audio data are stored in the predetermined medium.

The present invention further provides a method for playing back, on a playback apparatus, a medium having audio data stored thereon, wherein it is determined whether a medium received by the playback apparatus stores one or both of non-compressed audio data and compressed audio data; and the audio data stored on the received medium is played back according to the determination result. In the playback method according to the present invention, if it is determined that the received medium stores both non-compressed audio data and compressed audio data, one data of the non-compressed audio data and the compressed audio data is played back, and the other data is subsequently played back in a sequential manner.

BEST MODE FOR CARRYING OUT THE INVENTION

The present invention is described hereinbelow with respect to an embodiment.

Figure 1:
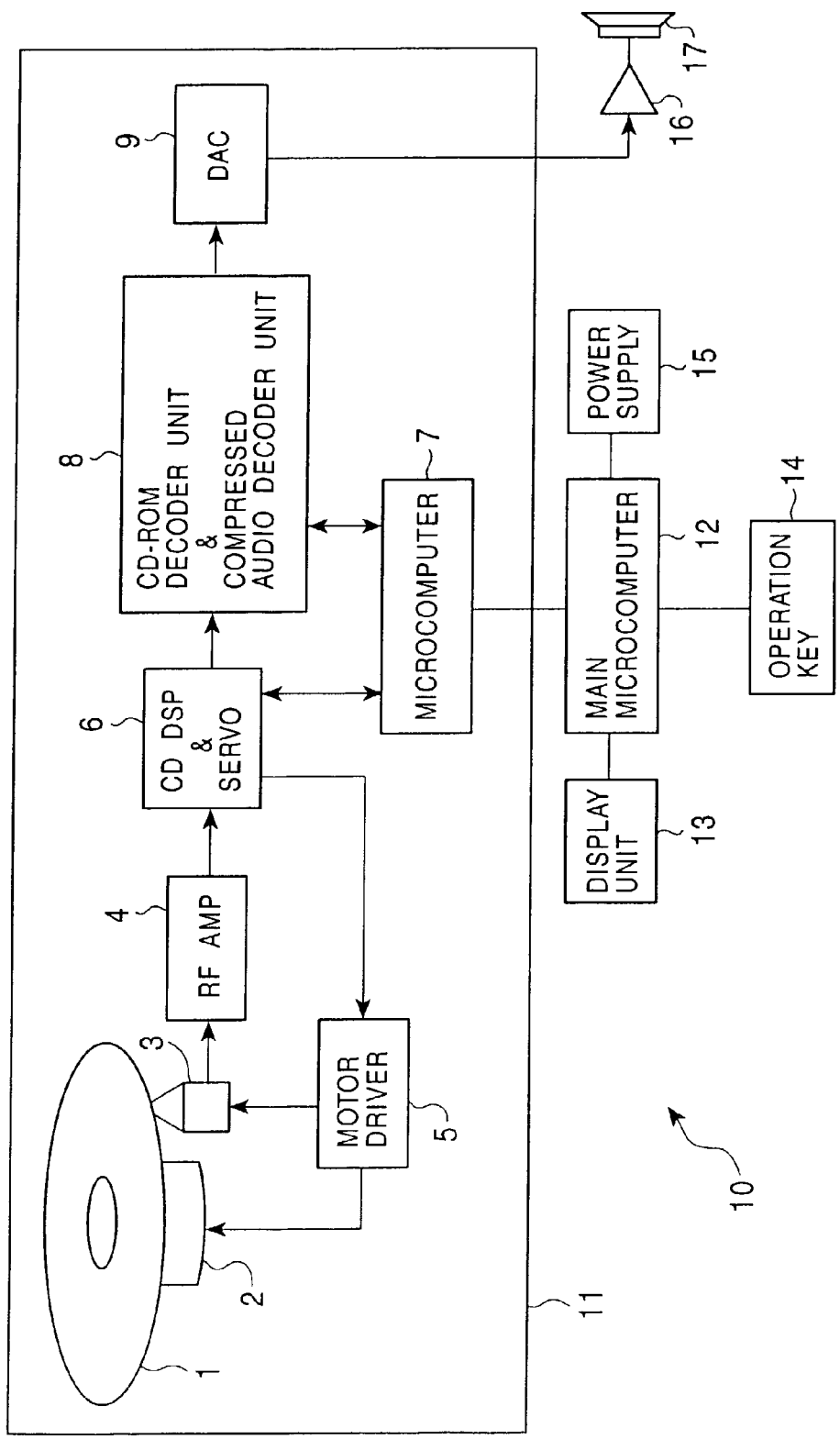
FIG. 1 is a block diagram showing the configuration of an audio device according the present embodiment.

FIG. 1 is a block diagram showing the system configuration of an audio device 10 according to the present embodiment.

The audio device 10 is formed of a mecha-deck unit 11, a main microcomputer 12, a display unit 13, an operation key 14, a power supply 15, an amp 16, and a speaker 17.

The mecha-deck unit 11 is formed of a spindle motor 2 which drives a disk 1 to rotate, a pickup 3 for reading data on the disk 1, an RF (Radio Frequency) amp 4, a motor driver 5, a CD DSP (Digital Signal Processor) & servo 6, a microcomputer 7, a decoder 8 comprising a CD-ROM decoder unit and a compressed audio data decoder unit, and a DAC (D/A converter) 9.

The main microcomputer 12 supervises the overall control of the audio device 10. The display unit 13 and the operation key 14 are connected to the main microcomputer 12. When the operation key 14 corresponding to the operation desired by a user is operated, the main microcomputer 12 instructs the microcomputer 7 of the mecha-deck unit 11 to perform that operation. The display unit 13 displays the operation state of the audio device 10, and others.

The operation to play back audio data recorded on the disk 1 on the thus constructed audio device 10 is now described. The audio device 10 has two modes, as selections for audio data playback modes, namely, a mode for playing back CD-DA non-compressed audio data, and a mode for playing back MP3 etc. compressed audio data, and may select one of them. It is noted that what is simply called audio data collectively refers to compressed audio data and non-compressed audio data. Although MP3 is described as compressed audio data by way of example in the present embodiment, it goes without saying that other formats of compressed audio data, such as ATRAC3 and WMA described above, may also be used.

First, a playback mode for CD-DA non-compressed audio data is described. This playback mode can function if the disk 1 is one of a CD-DA disk, a Mixed-mode CD, and an Enhanced CD.

The motor driver 5 causes the spindle motor 2 having the disk 1 loaded thereon to rotate. The pickup 3 reads CD-DA audio data from the disk 1 which is rotating. The CD-DA audio data read from the pickup 3 is amplified by the RF amp 4, and is demodulated by the CD DSP & servo 6. The signal demodulated by the CD DSP & servo 6 is applied to the DAC 9 through the decoder 8. That signal merely passes through the decoder 8. The DAC 9 which has received the signal demodulated by the CD DSP & servo 6 converts that signal into an audio signal, and outputs the result to the amp 16. The audio signal amplified by the amp 16 is played back through the speaker 17. The above-described series of processes is controlled by the microcomputer 7 according to instructions from the main microcomputer 12.

Then, a playback mode for MP3 etc. compressed audio data is described. This playback mode can function if the disk 1 is one of a CD-ROM disk, a Mixed-mode CD, and an Enhanced CD.

The motor driver 5 causes the spindle motor 2 having the disk 1 loaded thereon to rotate. The pickup 3 reads audio data in the CD-ROM format, that is, as computer data, from the disk 1 which is rotating. The audio data read from the pickup 3 is amplified by the RF amp 4, and is demodulated by the CD DSP & servo 6. The operation up to now is the same as that for playback of CD-DA non-compressed audio data. The signal demodulated by the CD DSP & servo 6 is passed to the CD-ROM decoder unit in the decoder 8, where the data is demodulated into CD-ROM format, from which MP3 etc. audio data, that is, compressed audio data, is extracted. The extracted compressed audio data is demodulated into CD-DA audio data by the compressed audio decoder unit in the decoder 8. The CD-DA audio data is converted into an audio signal by the DAC 9, and the result is output to the amp 16. The audio signal amplified by the amp 16 is played back through the speaker 17. The above-described series of processes is controlled by the microcomputer 7 according to instructions from the main microcomputer 12.

While a playback mode for CD-DA non-compressed audio data and a playback mode for MP3 etc. compressed audio data have been separately described, the audio device 10 according to the present embodiment can analyze the format of the disk 1 to select a playback mode according to the analysis result. This analysis is based on recognizing whether the disk 1 is of the CD-DA, CD-ROM, Mixed-mode CD, or Enhanced CD format, or any other format CD.

Figure 4:
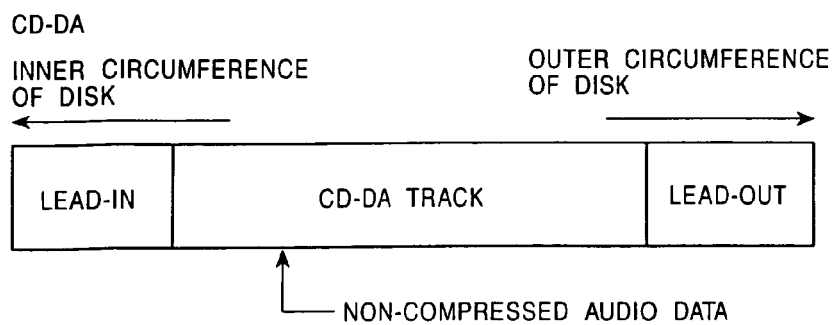
FIG. 4 is a diagram showing the file structure of a CD-DA.

The file structure of the disk 1 in various formats is now described. FIG. 4 shows the file structure of the disk 1 in the CD-DA format. In CD-DA, a lead-in, a CD-DA track, and a lead-out are sequentially arranged from the inner circumference of the disk 1. One unit starting with the lead-in and ending with the lead-out is referred herein to as a session. The published standards for CD-DA, the "Red Book," specifies that a CD-DA has only one session. A CD-DA track contains a single or a plurality of songs. The songs are written as non-compressed audio data. The lead-in contains a TOC (Table Of Contents). The TOC contains information in the CD-DA track, that is, information about the start time of each track (each song) and information indicating that the data in the data storage area (the CD-DA track in this case) is CD-DA audio data. The TOC also contains information indicating a single or a plurality of sessions. A TOC in disks of other formats contains the same information.

Figure 5:
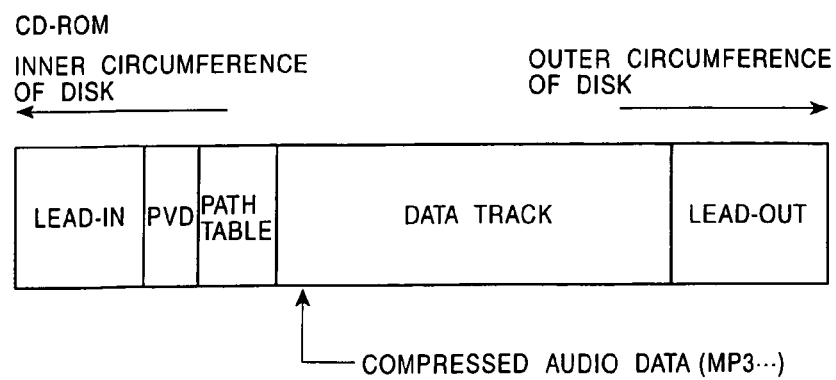
FIG. 5 is a diagram showing the file structure of a CD-ROM.

Next, FIG. 5 shows the file structure of the disk 1 in the CD-ROM format. The specification of the CD-ROM is defined in the "Yellow Book" as a medium which is an extension of the CD-DA developed for music and which stores computer-manipulated data. In CD-ROM, a lead-in, a PVD (Primary Volume Descriptor), a path table, a data track, and a lead-out are sequentially arranged from the inner circumference of the disk 1. Similarly to CD-DA, a session represents one unit starting with the lead-in and ending with the lead-out. The lead-in contains a TOC, and the TOC is referred to, thereby recognizing if computer data is stored in the data track. The data track contains a single or a plurality of songs. The songs are written as compressed audio data, for example, MP3. The compressed audio data has a computer data format. By referring to the PVD and the path table, the presence of compressed audio data can be checked. For example, if an extension "mp3" is added to the file name of MP3 compressed audio data, the information about that extension can be confirmed by referring to the PVD and the path table. Computer data other than compressed audio data may also be written on the data track.

Figure 6:
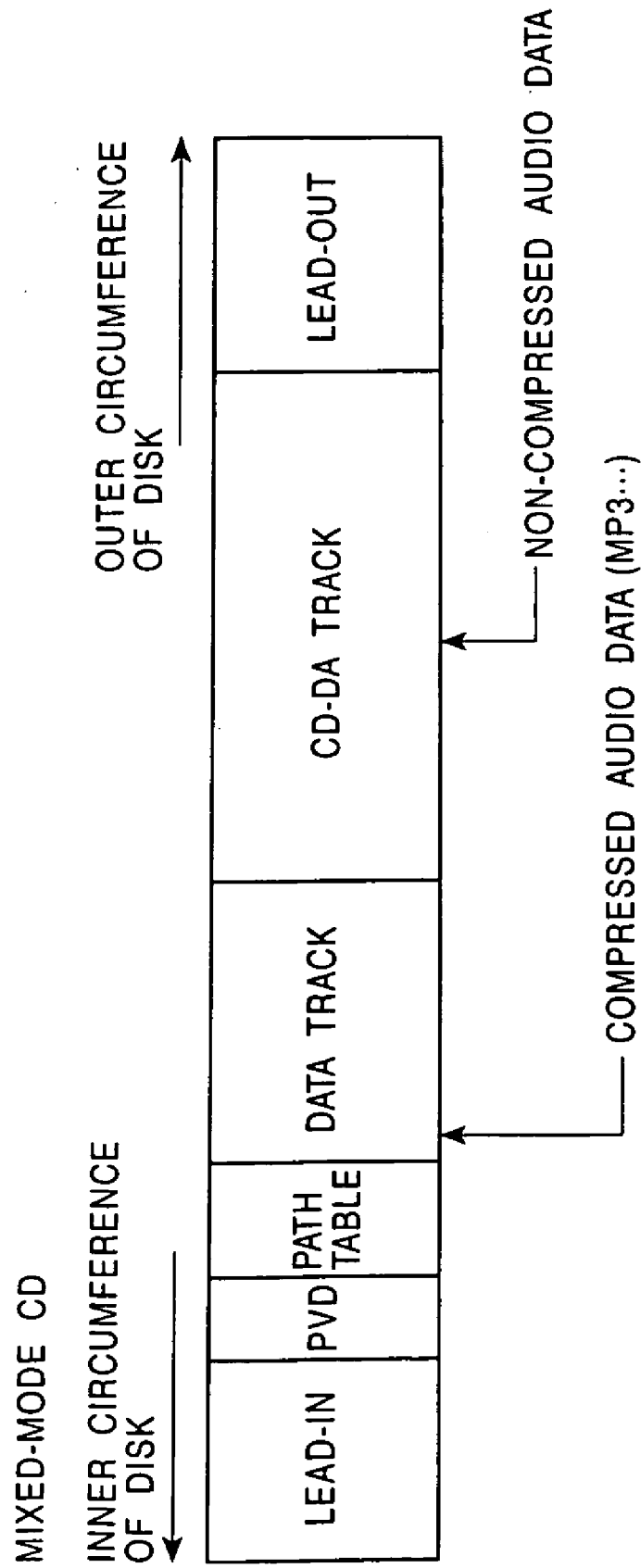
FIG. 6 is a diagram showing the file structure of a Mixed-mode CD.

FIG. 6 shows the file structure of a Mixed-mode CD. As previously described, the Mixed-mode CD stores a data track and an audio track in a single medium. That is, in the Mixed-mode CD, a lead-in, a PVD, a path table, a data track, a CD-DA track, and a lead-out are sequentially arranged from the inner circumference of the disk 1. The data track contains a single or a plurality of songs. These songs are written as compressed audio data, for example, MP3. The CD-DA track contains a single or a plurality of songs. The songs are written as non-compressed audio data. Therefore, the Mixed-mode CD serves as a music medium having a mixture of compressed audio data and non-compressed audio data. Similarly to the CD-ROM format, computer data other than compressed audio data can be written on the data track.

Figure 7:
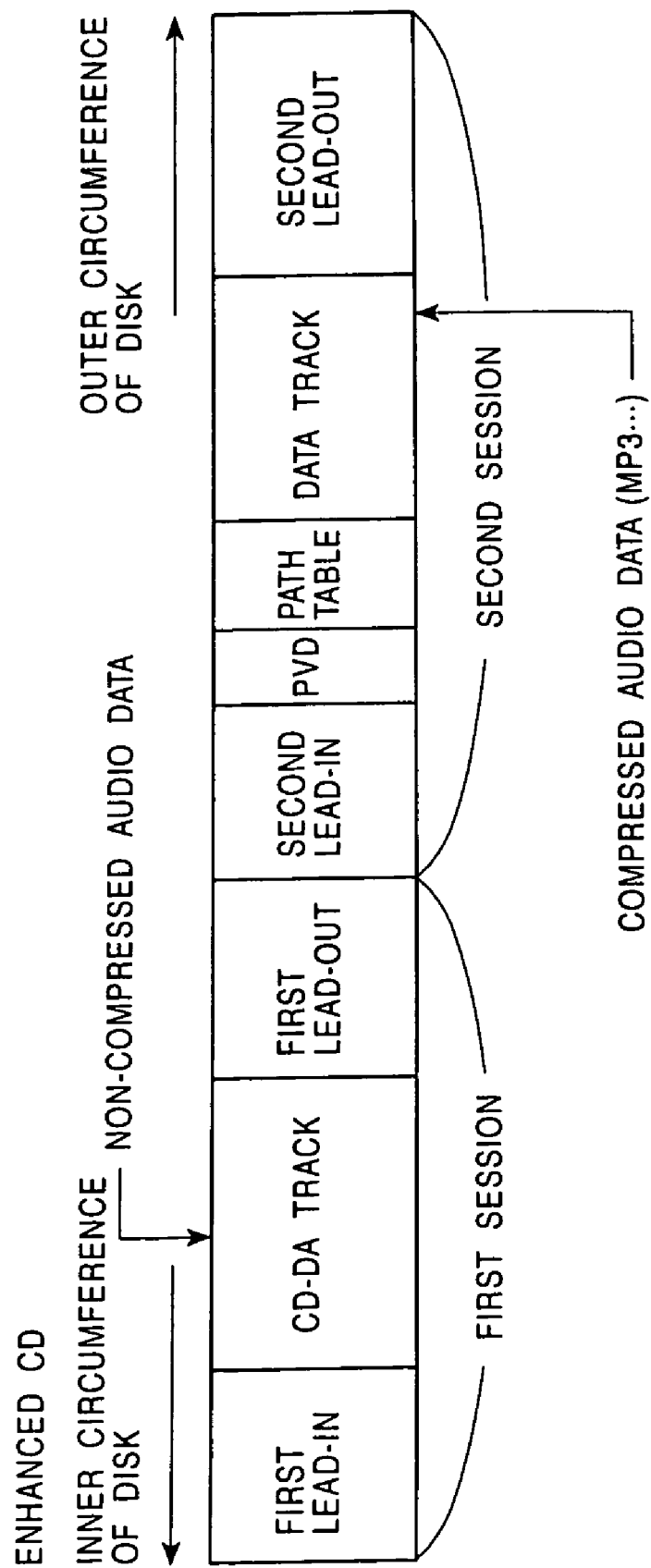
FIG. 7 is a diagram showing the file structure of an Enhanced CD.

FIG. 7 shows the file structure of an Enhanced CD. As described above, the Enhanced CD has two sessions in a single medium, and the specification thereof is defined in the "Blue Book". In the Enhanced CD, a first lead-in, a CD-DA track, a first lead-out, a second lead-in, a PVD, a path table, a data track, and a second lead-out are sequentially arranged from the inner circumference of the disk 1. Similarly to the Mixed-mode CD, compressed audio data can be written on the data track, and non-compressed audio data can be written on the CD-DA track. Therefore, the Enhanced CD serves as a music medium having a mixture of compressed audio data and non-compressed audio data. The difference between the Enhanced CD and the Mixed-mode CD is that the Mixed-mode CD has only one session, whilst the Enhanced CD has two sessions, namely, the first session and the second session. In addition, the Mixed-mode CD has the data track and the CD-DA track, which exist in a single session, whilst the Enhanced CD has only either the data track or the CD-DA track, which exists in a single session.

Since a CD-DA, a CD-ROM, a Mixed-mode CD, and an Enhanced CD are different in file structure as described above, by referring to the file structure the format of the predetermined disk 1 can be determined.

In the following description, a routine for analyzing the disk format of the disk 1 which is loaded on the audio device 10 and for playing back audio data based on the analysis result is described with reference to the flowcharts shown in FIGS. 2 and 3. The routine in the flowcharts shown in FIGS. 2 and 3 is executed by a program installed in the microcomputer 7 in the mecha-deck unit 11.

Figure 2:
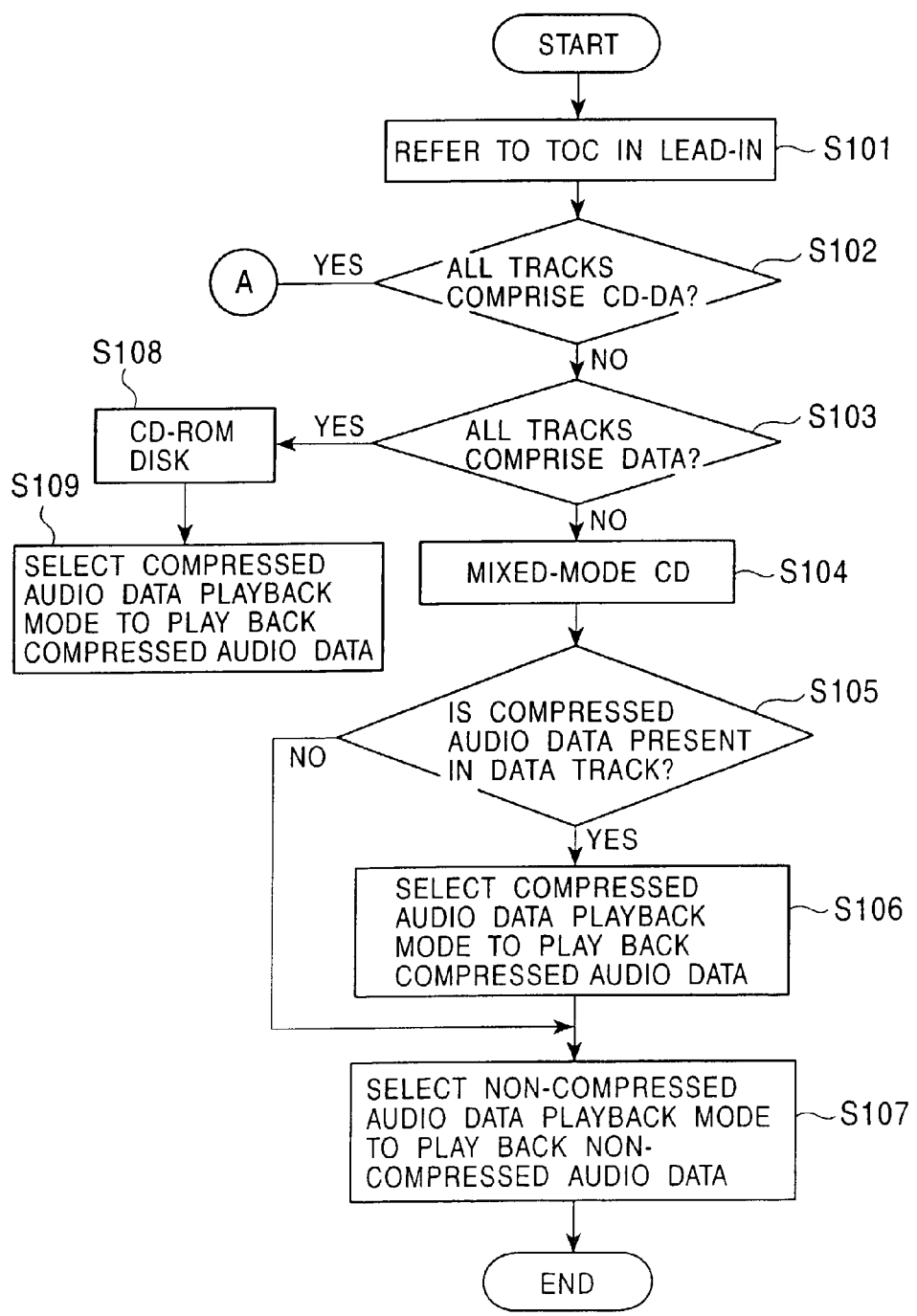
FIG. 2 is a flowchart showing a playback routine for the audio device according to the present embodiment.
Figure 3:
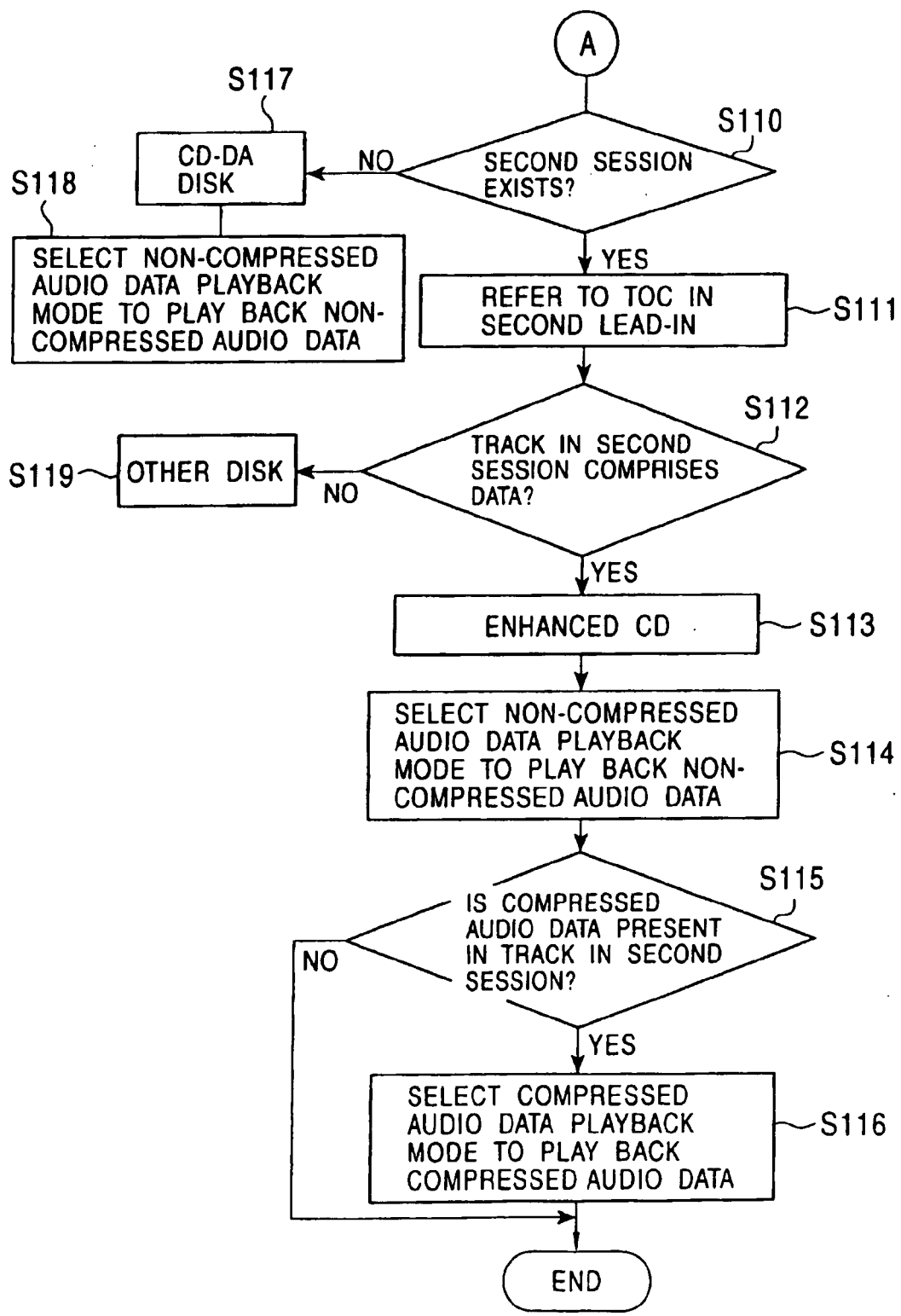
FIG. 3 is a flowchart showing a playback routine for the audio device according to the present embodiment.

FIGS. 2 and 3 show a series of processes in the audio device 10, in which FIG. 2 shows a routine when the disk 1 is of the CD-ROM format or Mixed-mode CD, and FIG. 3 shows a routine when the disk 1 is of the CD-DA format, the Enhanced CD format, or other formats.

When a user uses the operation key 14 to request to play back the disk 1, the TOC (Table Of Contents) in the lead-in is referred to through the pickup 3 (S101). In the storage disk of this type, it is defined that the lead-in on the inner circumference of the disk be accessed first. Therefore, in the case of an Enhanced CD including two sessions, the TOC in the first session should be referred to.

By referring to the TOC, it is determined whether or not all the tracks in the disk 1 are in the CD-DA format (S102). If all the tracks comprise CD-DA data, the routine proceeds to S110 shown in FIG. 3. The routine subsequent to S110 is described later.

If it is determined in S102 that all the tracks are not in the CD-DA format, then, in S103, it is determined whether or not all the tracks comprise data. The data as referred to herein means computer data, and does not include CD-DA audio data. If all the tracks comprise data, it is recognized that the disk 1 is a disk of the CD-ROM format (S108). In other words, it is determined that it is a medium having only compressed audio data stored thereon as audio data. Then, the audio device 10 selects a compressed audio data playback mode to play back the compressed audio data in the data track (S109).

If it is determined in S103 that all the tracks do not comprise data, it can be recognized that the disk 1 is a medium having a mixture of the data track and the CD-DA track in a single session since it is determined in S102 that all the tracks do not comprise CD-DA. That is, it is determined that the disk 1 is a Mixed-mode CD (S104).

Even if the disk 1 is a Mixed-mode CD, compressed audio data is not necessarily present in its data track. Then, it is determined whether or not compressed audio data is present in the data track (S105). This determination can be performed by referring to the PVD and the path table to find the presence or absence of an extension indicating compressed audio data. As described above, if an MP3 extension is, for example, "mp3", by finding the extension "mp3," it can be recognized if compressed audio data is present in the data track. Consequently, it should be determined that the disk 1 is a medium having a mixture of compressed audio data and non-compressed audio data.

If compressed audio data is present, the audio device 10 selects a compressed audio data playback mode to play back the compressed audio data in the data track (S106). After playing back the compressed audio data in the data track, the audio device 10 selects a non-compressed audio data playback mode to play back the non-compressed audio data in the CD-DA track (S107).

If, on the other hand, it is determined in S105 that compressed audio data is not present in the data track, the audio device 10 selects a non-compressed audio data playback mode to play back the non-compressed audio data in the CD-DA track (S107).

Next, the routine subsequent to S110 is described with reference to FIG. 3. The routine subsequent to S110 corresponds to a routine when it is determined in S102 that all the tracks have CD-DA audio data stored therein.

If it is determined in S102 that all the tracks have CD-DA audio data stored therein, it is determined whether or not a second session exists in the disk 1 (S110). The presence or absence of the second session can be determined based on the information in the TOC. If it is determined that no second session exists, it should be determined that the disk 1 is a disk of the CD-DA format (S117) since the disk 1 has a single session and it is determined in S102 that CD-DA audio data is stored in all the tracks in the session. If it is determined that it is a disk of the CD-DA format, the audio device 10 selects a non-compressed audio data playback mode to play back the non-compressed audio data in the CD-DA track (S118).

If it is determined in S110 that a second session exists, a second lead-in is read (S111). The TOC in the second lead-in is referred to to determine whether or not the track in the second session is a data track (S112). If it is determined that the track in the second session is a data track, it is then determined that the disk 1 is an Enhanced CD (S113) since a CD-DA track is present in the first session. If, on the other hand, the track in the second session is not a data track, it is determined that it is a disk in another format (S119).

If it is determined in S113 that it is an Enhanced CD, the audio device 10 selects a non-compressed audio data playback mode to play back the non-compressed audio data in the CD-DA track (the first session) (S114). Then, after playback of the non-compressed audio data in the CD-DA track is completed, it is determined whether or not compressed audio data is present in the data track in the second session (S115). The technique to determine whether or not compressed audio data is present is the same as in S105. If compressed audio data is present, the audio device 10 selects a compressed audio data playback mode to play back the compressed audio data in the data track (the second session) (S116). After playback of the compressed audio data in the data track is completed, or if compressed audio data is not present, the routine ends.

As described above, the audio device 10 according to the present embodiment can play back the disk 1 having a mixture of CD-DA non-compressed audio data and compressed audio data. While non-compressed audio data has a large storage volume and superior sound quality, compressed audio data has slightly poorer sound quality, but has a small storage volume. A user should store songs sensitive to sound quality as CD-DA non-compressed audio data, and store songs insensitive to sound quality, such as background music, as MP3 etc. compressed audio data. When such a disk 1 is played back on the audio device 10, the user does not have to be nervous about a mixture of non-compressed audio data and compressed audio data.

The above-described embodiment is merely one form of the present invention. For example, after a Mixed-mode CD is determined in S104, the compressed audio data is played back after which the CD-DA non-compressed audio data is played back; however, the playback may be reordered so that the non-compressed audio data is played back after which the compressed audio data is played back. Also after an Enhanced CD is determined in S113, the CD-DA non-compressed audio data is played back after which the compressed audio data is played back; however, after the determination in S115, that is, after it is determined whether or not compressed audio data is present in the track in the second session, the series of playback processes may be performed.

In the foregoing embodiment, after a Mixed-mode CD is determined, and playback for all compressed audio data is completed, non-compressed audio data is played back; however, compressed audio data and non-compressed audio data may be alternately played back. Moreover, after a Mixed-mode CD is determined, song names corresponding to the data stored in the data track and the CD-DA track may be presented on the display 13 to play a user selected song. The same as the playback technique is true for an Enhanced CD.

A variety of other modifications may be made without departing from the spirit and scope of the present invention, in which the format of the disk 1 is analyzed and compressed audio data and non-compressed audio data, which are mixed in the single disk 1, are played back according to this analysis result.

As described above, according to the present invention, an audio data storage medium having a mixture of compressed audio data and non-compressed audio data is provided, thus allowing a user to enjoy music on a single disk having many songs sensitive to sound quality and songs insensitive to sound quality stored thereon. According to the present invention, furthermore, without having to change a disk, a user can enjoy music on an audio data storage medium having a mixture of compressed audio data and non-compressed audio data.

The invention claimed is:

1. A playback apparatus for playing back a medium having audio data stored thereon, comprising:
   a recognition unit configured to recognize a session of the medium, wherein each session includes a lead-in area, a data storage area, and a lead-out area;
   a determining unit configured to determine that the medium received therein contains a mixture of compressed audio data and non-compressed audio data in the data storage area of each session; and
   a playback mechanism configured to play back the compressed audio data and the non-compressed audio data stored in the medium based on results of both the determining unit and recognition unit, the playback mechanism reproducing the compressed audio data before the non-compressed audio data when only one session is recognized by the recognition unit, and reproducing the non-compressed audio data before the compressed audio data when two sessions are recognized by the recognition unit.

2. The playback apparatus according to claim 1, wherein the medium includes at least two sessions each including a lead-in area a data storage area, and a lead-out area, and the determining unit is further configured to determine that compressed audio data is stored in the data storage area in at least one session of the at least two sessions and non-compressed audio data is stored in the data storage area in another session of the at least two sessions.

3. The playback apparatus according to claim 1, wherein the determining unit is further configured to determine whether one of compressed audio data or non-compressed audio data is stored in the data storage area in the session.

4. A method for playing back, on a playback apparatus, a medium, the method comprising:
   recognizing a session of the medium, wherein each session includes a lead-in area, a data storage area, and a lead-out area;
   determining the medium contains a mixture of compressed audio data and non-compressed audio data in the data storage area of each session; and
   reproducing the compressed audio data and non-compressed audio data stored in the medium based on results of both the determining and recognizing, the reproducing reproduces the compressed audio data before the non-compressed audio data when only one session is recognized, and reproduces the non-compressed audio data before the compressed audio data when two sessions are recognized.

5. A playback apparatus for playing back a medium having audio data stored thereon, comprising:
   a means for recognizing a session of the medium, wherein each session includes a lead-in area, a data storage area, and a lead-out area;
   a means for determining that the medium received therein contains a mixture of compressed audio data and non-compressed audio data in the data storage area of each session; and
   a means for reproducing the compressed audio data and the non-compressed audio stored in the medium based on results of both the means for recognizing and means for determining, the means for reproducing reproduces the compressed audio data before the non-compressed audio data when only one session is recognized by the means for recognizing, and reproduces the non-compressed audio data before the compressed audio data when two sessions are recognized by the means for recognizing.

* * * * *